Sept. 17, 1963 V. L. NELSON 3,103,922
ROCK CUTTING APPARATUS
Filed Sept. 19, 1962 3 Sheets-Sheet 1
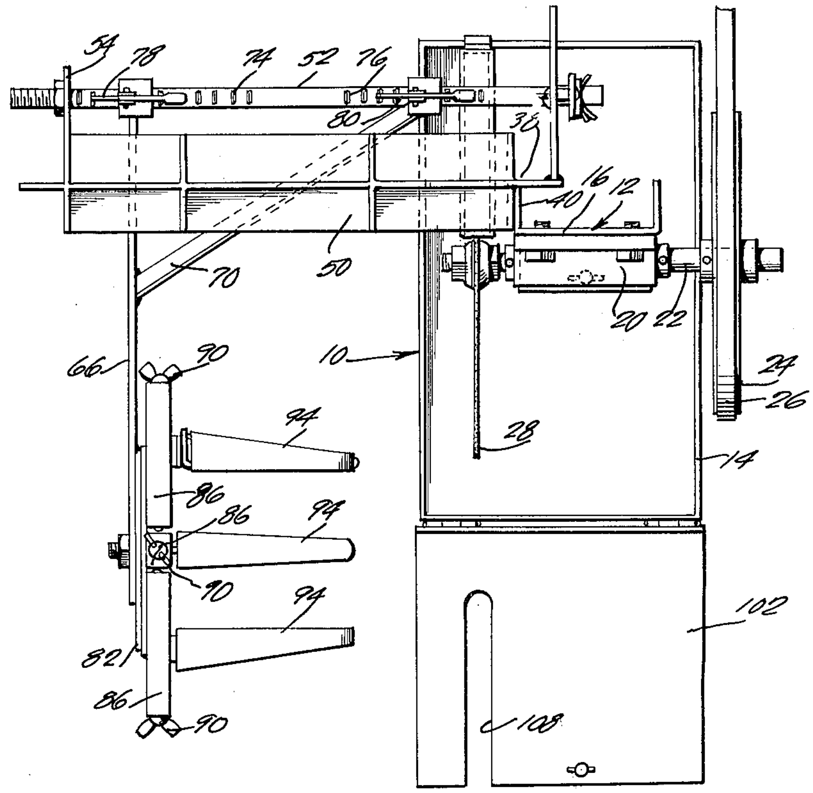
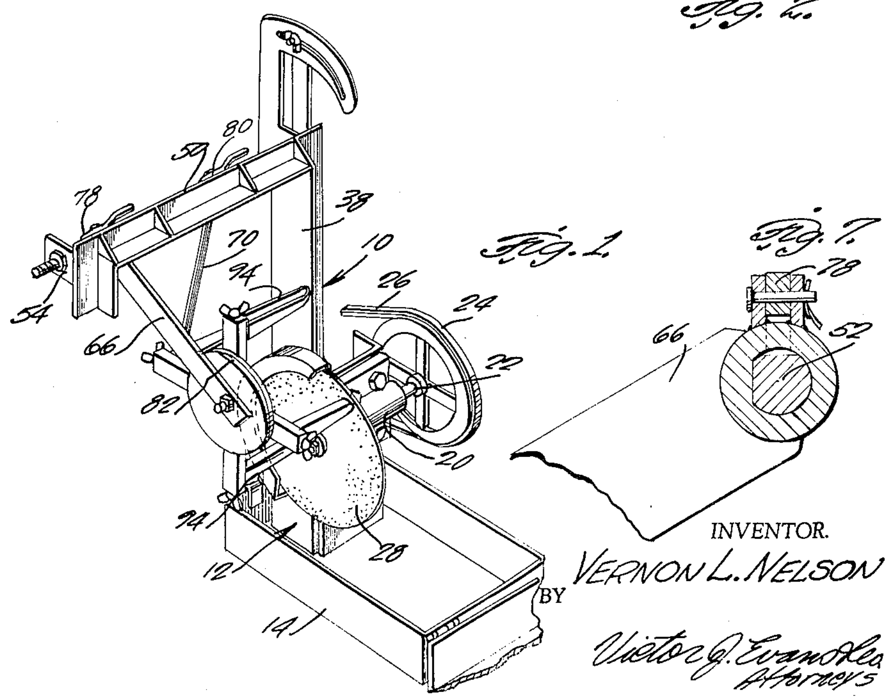

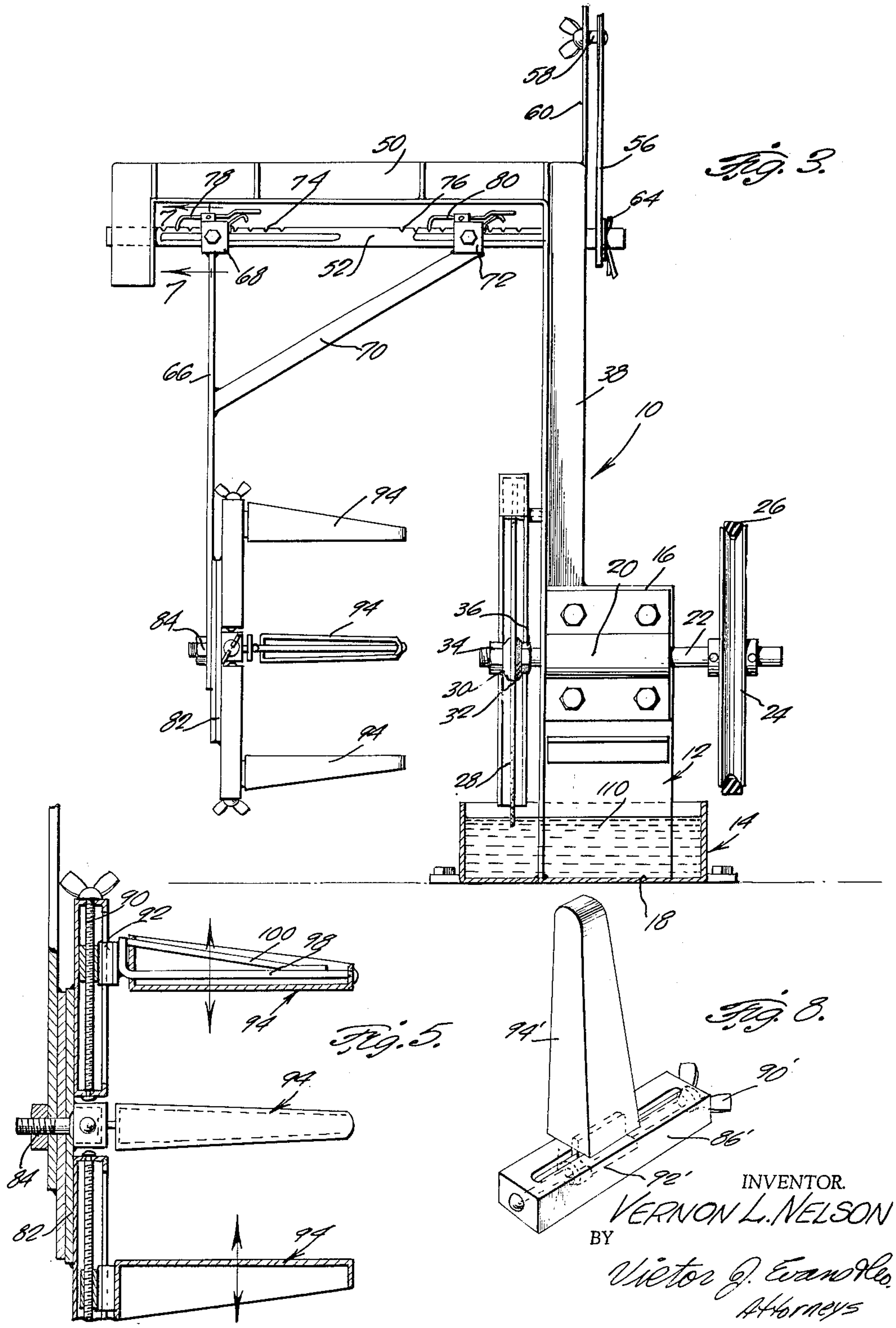
INVENTOR.
VERNON L. NELSON
BY
Victor J. Evans & Co.
Attorneys

Sept. 17, 1963
V. L. NELSON
3,103,922
ROCK CUTTING APPARATUS
Filed Sept. 19, 1962
3 Sheets-Sheet 3
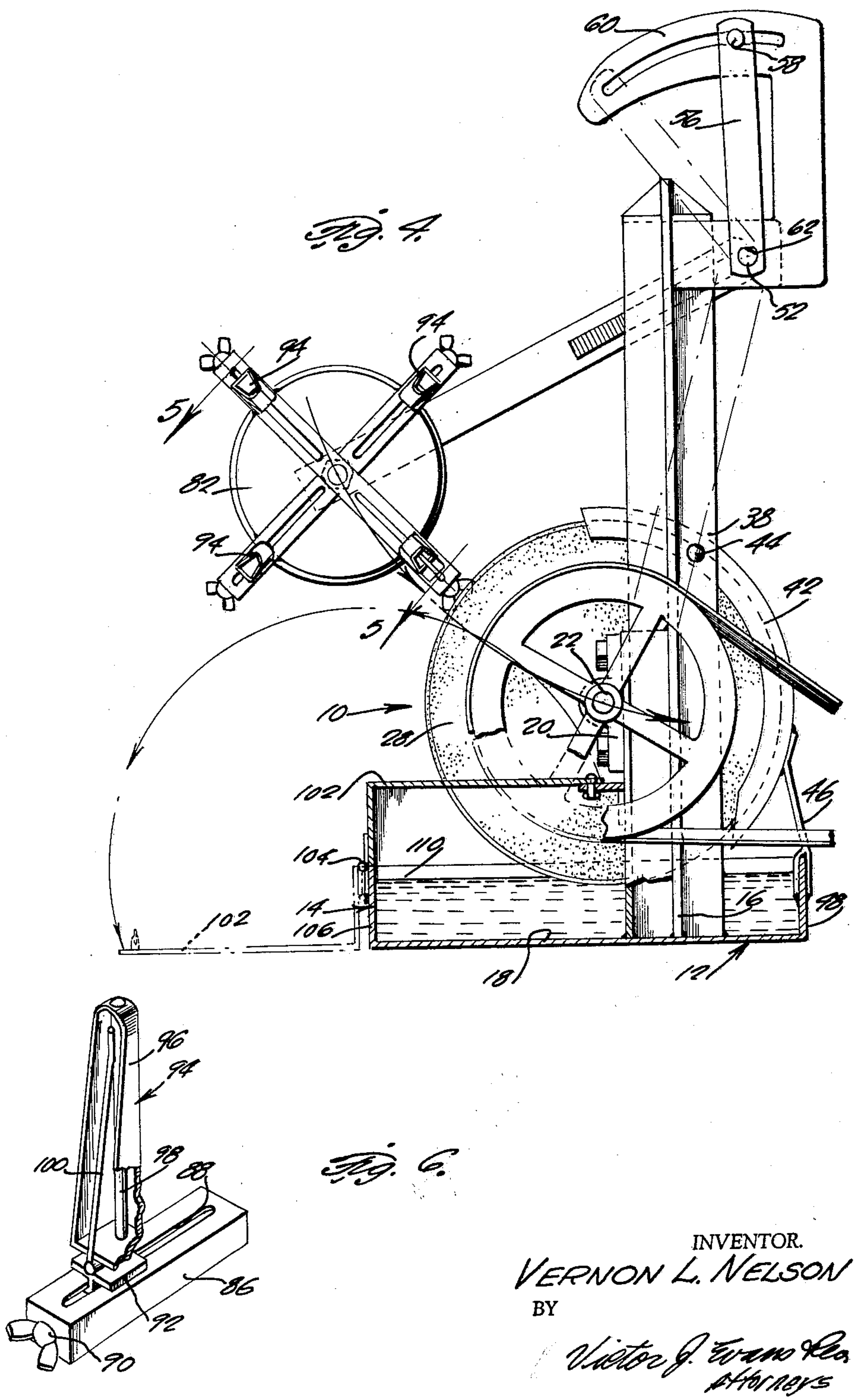
INVENTOR.
VERNON L. NELSON
BY
Victor J. Evans & Co.
Attorneys United States Patent Office 3,103,922

Patented Sept. 17, 1963

1

3,103,922

ROCK CUTTING APPARATUS

Vernon L. Nelson, Rte. 2, Box 115, Portland, Oreg.

Filed Sept. 19, 1962, Ser. No. 224,712
2 Claims. (Cl. 125—13)

The present invention relates to an apparatus for sawing rock specimens so as to produce gems or semi-precious stones for collector purposes.

Presently on the market are saws for rocks which enable a person to saw a straight face on a rock for exhibition purposes. Such saws as are available have a failing that they require relatively large blades for sawing in a single cut a rock to be displayed.

An object of the present invention is to provide a rock cutting apparatus which permits the use of a relatively small blade to cut a rock of ordinary size which formerly required a larger blade.

Another object of the present invention is to provide a rock cutting apparatus which permits cutting of a large face on rocks and trimming of the sides of the rock to a block for specimen exhibition purposes.

A still further object of the present invention is to provide a rock cutting apparatus which is simple in structure, one which may be manufactured of ordinary materials and with ordinary tools, one which is sturdy in construction and having long life characteristics, and one which is economically feasible.

With these objects in mind, the following description of the rock cutting apparatus of the present invention is to be taken in connection with the annexed drawings, in which:

FIGURE 1 is a perspective view of the apparatus according to the present invention, FIGURE 2 is a plan view, FIGURE 3 is an elevational view partially in section, FIGURE 4 is a side elevational view partially in section, FIGURE 5 is a view on an enlarged scale taken on the line 5—5 of FIGURE 4, FIGURE 6 is a perspective view of one of the abutment members removed from the supporting disc with a portion broken away, FIGURE 7 is a view on an enlarged scale, taken on the line 7—7 of FIGURE 3, and FIGURE 8 is a perspective view of a modified form of the abutment member according to the present invention.

Referring in detail to the drawings in which like numerals indicate like parts throughout the several views, the apparatus of the present invention is designated generally by the reference numeral 10 and it consists of a frame 12 having an open top receptacle 14 formed as a part thereof.

The frame 12 includes an upright section of channel iron 16 having its lower end secured by welding or other means to the bottom 18 of the receptacle 14. Secured to the portion of the channel iron 16 adjacent the upper end is a bearing block 20 having a horizontally disposed shaft 22 journaled therein.

The portion of the shaft 22 adjacent one end carries a pulley 24 over which travels a V-belt 26 operatively connected to a source of rotary power such as a motor, the latter not being shown as not being a part of the present invention.

On the other end portion of the shaft 22 is mounted a saw blade 28 of the type employed to cut ceramic or rock material. The blade 28 is secured to the shaft 22 by means of mating washers 30 and 32 disposed between nuts 34 and 36 threadedly mounted upon the threaded end portion of the shaft 22.

2

A post 38 rises from the bottom 18 of the receptacle 14 adjacent to and spaced from the blade 28 and is fixedly secured by welding or other means to the flange 40 of the channel member 16, as shown most clearly in FIGURE 2.

An arcuately shaped guard 42 extends in spaced relation about a portion of the periphery of the blade 28 and is secured by a bolt 44 to the post 38 and also is provided on its lower end with a bifurcated bracket 46 receiving therebetween the upper edge portion of the end wall 48 of the receptacle 14.

A horizontally disposed support 50 projects from the upper end of the post 38 and is fixedly secured thereto.

Connected to the support 50 and the post 38 is a shaft 52, arranged horizontally, and mounted for limited rotary movement about a horizontal axis. The shaft 52 has the portion adjacent one end extending through a bracket 54 projecting from the free end of the support 50 and has the portion adjacent the other end secured to the lower end portion of an upright strap 56 which has its upper end portion connected by a thumb nut and bolt assembly 58 to an arcuate bracket 60 projecting from the upper end of the post 38.

As shown most clearly in FIGURE 4, the shaft 52 has a flat side 62 and the strap 56 has its shaft receiving hole conformably shaped to fit the shaft 52. A cotter pin 64 extending through a hole provided in the shaft 52 secures the strap 56 from movement off of the shaft 52. An upwardly sloping bar 66 has its upper end portion formed to a sleeve 68 slidably mounted upon the shaft 52. A brace 70 extends from a mid-portion of the bar 66 to another sleeve 72 similarly slidable upon the shaft 52. The shaft 52 is provided with two series of notches 74 and 76 in which are selectively receivable spring biased latches 78 and 80, respectively, affixed to the sleeves 68 and 72, respectively.

The end of the bar 66 remote from the sleeve 68 rotatably supports a disc 82 thereon, the disc 82 being secured to the bar 66 by means of a bolt and nut assembly 84, the disc 82 being rotatable about the bolt and nut assembly 84 as a horizontal axis.

Secured to the face of the disc 82 adjacent to the blade 28 are radially arranged casings 86 each having a slot 88 in one face thereof and each casing 86 having a thumb bolt 90 journaled therein. This structure is shown most clearly in FIGURE 6. A slide element 92 has a portion within the casing 86 threadedly engaged upon the bolt 90 and rotary movement of the bolt 90 results in sliding movement of the slide element 92 toward and away from the ends of the casing 86.

Each of the slide elements 92 carries an abutment member 94 fabricated of a box-like structure 90 mounted upon a rod 98 and reinforced by an angularly disposed brace 100.

By turning of the respective bolts 90 the abutment members 94 are independently movable toward and away from the center of the disc 82.

In FIGURE 8 a modified form of the abutment member 94' is shown in which it is solid and is mounted upon a slide element 92' journaled on a bolt 90' for back and forth movement with respect to the casing 86'.

A feature of the invention resides in the provision of a cover 102 connected by a hinge 104 to the end wall 106 of the receptacle 14. The cover 102 is provided with a slot 108, as shown in FIGURE 2.

In use, the receptacle 14 is employed to contain an emulsion suitable for use with the cutting blade 28. The emulsion is designated in FIGURES 3 and 4 by the numeral 110.

A rock to be cut is positioned between the abutment members 94 and they are tightened upon the rock so as to hold one of the rock securely. Loosening of the thumb nut and bolt assembly 58 permits swinging movement of the bar 66 so that the rock can be moved into the blade 28 for cutting thereof. The rock may be larger than the blade radius but as the disc 82 permits rotation of the abutment members 94 holding the rock, the rock may be rotated relative to the blade so that the rock can be cut by the blade with the blade actually smaller than the rock.

After the rock has been cut to one face or several faces, with the bar 66 shiftable along the shaft 52 to different positions so as to slice the rock at different depths, the rock piece may be put in the cover 102 and the cover 102 swung from the dotted line position to the full line position carrying the rock against the blade so as to trim the corners or to square off the rock as desired to make it a proper and desirable specimen for exhibition purposes.

While only a preferred embodiment of the present invention has been shown and described other embodiments are contemplated and numerous changes and modifications may be made in the invention without departing from the spirit thereof as set forth in the appended claims.

What is claimed is:

1. In a rock cutting apparatus including a frame and a rotary saw blade mounted on said frame for rotary movement about a horizontal axis, a vise for supporting a rock to be cut comprising a post rising from said frame adjacent to and spaced from said blade, a horizontally disposed shaft projecting from the upper end of said post and connected to said post for limited rotary movement about another horizontal axis, a bar disposed in parallel spaced relation with respect to said blade and having one end connected to said shaft for sliding movement toward and away from said blade, a disc disposed in paralllel relation with respect to said bar and connected to said bar for rotary movement about a further horizontal axis, and a plurality of abutment members arranged in spaced relation about and projecting from one face of said disc, each of said members being independently movable on said disc toward and away from the center of said disc, said members being adapted to abut against and hold therebetween a rock to be cut.

2. In a rock cutting apparatus including a frame and a rotary saw blade mounted on said frame for rotary movement about a horizontal axis, a vise for supporting a rock to be cut comprising a post rising from said frame adjacent to and spaced from said blade, a horizontally disposed shaft projecting from the upper end of said post and connected to said post for limited rotary movement about another horizontal axis, a bar disposed in parallel spaced relation with respect to said blade and having one end connected to said shaft for sliding movement toward and away from said blade, a disc disposed in parallel relation with respect to said bar and connected to said bar for rotary movement about a further horizontal axis, and a plurality of abutment members arranged in spaced relation about and projecting from the face of said disc contiguous to said blade, each of said members being independently movable on said disc toward and away from the center of said disc, said members being adapted to abut against and hold therebetween a rock to be cut.

References Cited in the file of this patent

UNITED STATES PATENTS

| | | |
|---|---|---|
| 129,064 | Smith | July 16, 1872 |
| 204,499 | Mumford | June 4, 1878 |
| 1,176,156 | Madigan et al. | Mar. 21, 1916 |
| 1,566,191 | Fleischel et al. | Dec. 25, 1925 |

FOREIGN PATENTS

| | | |
|---|---|---|
| 727,388 | Great Britain | Mar. 30, 1955 |